United States Patent [19]
Abe

[11] Patent Number: 5,706,141
[45] Date of Patent: Jan. 6, 1998

[54] PHOTOGRAPHING LENS

[75] Inventor: Tetsuya Abe, Hokkaido, Japan

[73] Assignee: Asahi Kogaku Kogyo Kabushiki Kaisha, Tokyo, Japan

[21] Appl. No.: 745,463

[22] Filed: Nov. 12, 1996

[30] Foreign Application Priority Data

Nov. 10, 1995 [JP] Japan ................................. 7-293010
Aug. 26, 1996 [JP] Japan ................................. 8-224084

[51] Int. Cl.$^6$ ................................................ G02B 13/02
[52] U.S. Cl. .......................... 359/793; 359/740; 359/794
[58] Field of Search .................................. 359/691, 740, 359/793, 794

[56] References Cited

U.S. PATENT DOCUMENTS

| | | |
|---|---|---|
| 4,818,081 | 4/1989 | Ito . |
| 5,280,390 | 1/1994 | Ito . |
| 5,490,014 | 2/1996 | Suzuki ................................ 359/745 |
| 5,546,232 | 8/1996 | Hirakawa . |

Primary Examiner—David C. Nelms
Assistant Examiner—John P. Cornely
Attorney, Agent, or Firm—Greenblum & Bernstein P.L.C.

[57] ABSTRACT

A photographing lens includes a first lens group, a diaphragm, and a positive second lens group, in this order from the object side. The photographing lens satisfies the following relationships: $|f/f_1|<0.2$, and $0.7<h_{I-1}/h_{I-L}<1.0$. In the above relationships, "f" designates the focal length of the entire photographing lens, "$f_1$" the focal length of the first lens group, "$h_{I-1}$" the height of the incident point of paraxial rays on axis on the first surface of the first lens group, and "$h_{I-L}$" the height of the incident point of paraxial on-axis rays on the last surface of the first lens group, respectively.

3 Claims, 6 Drawing Sheets

FIG. 7
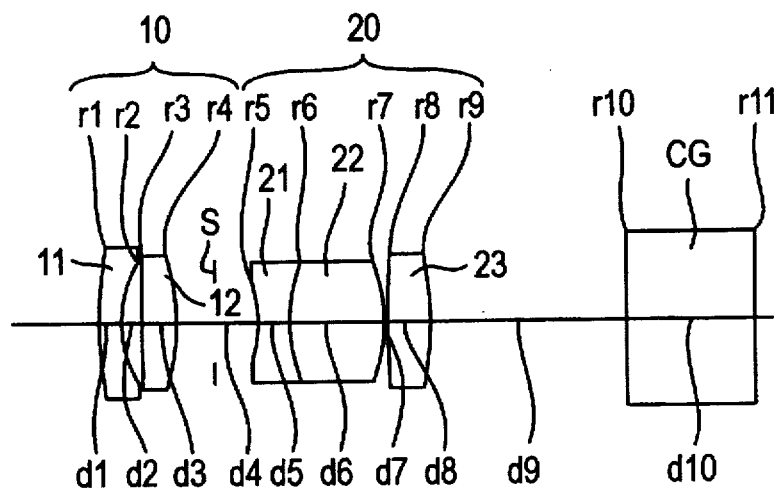
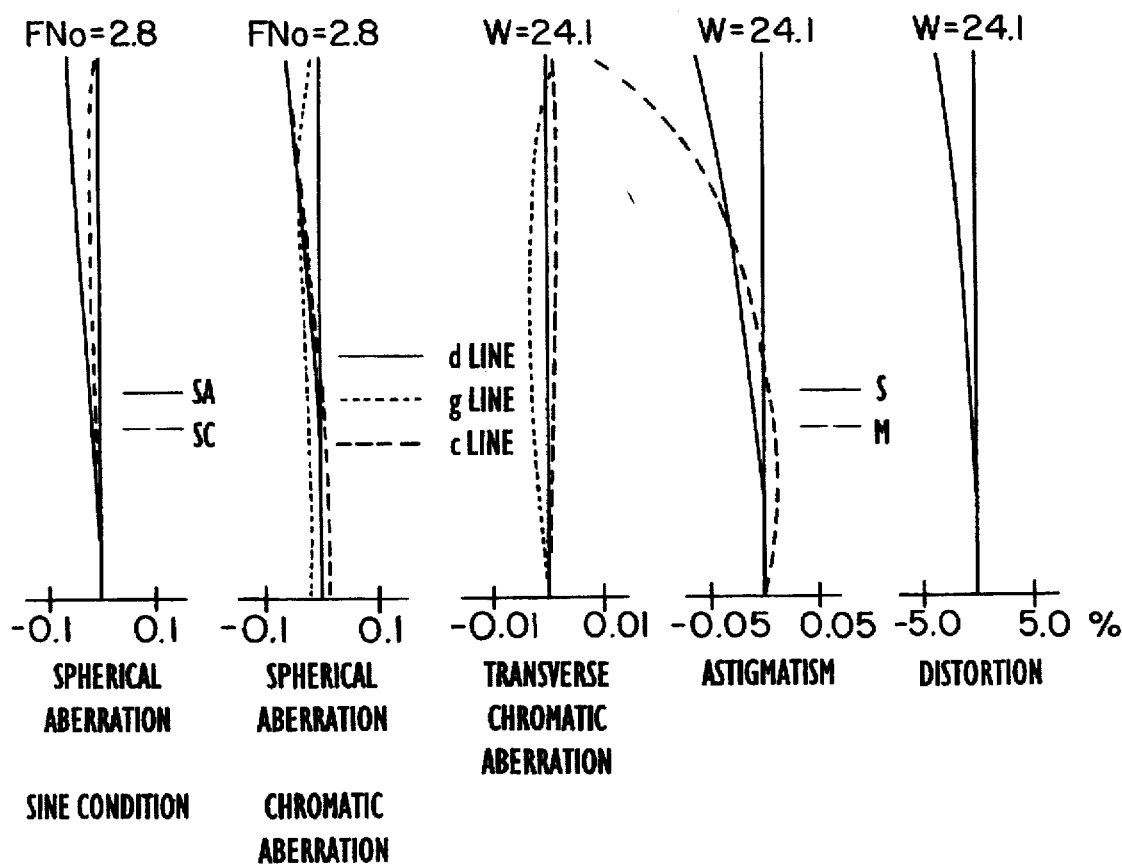
FIG. 8A  FIG. 8B  FIG. 8C  FIG. 8D  FIG. 8E
SPHERICAL ABERRATION SINE CONDITION
SPHERICAL ABERRATION CHROMATIC ABERRATION
TRANSVERSE CHROMATIC ABERRATION
ASTIGMATISM
DISTORTION 5,706,141

PHOTOGRAPHING LENS

BACKGROUND OF THE INVENTION

1. Field of the Invention

The present invention relates to a photographing lens for a small CCD camera or the like.

2. Description of the Related Art

A high definition CCD element having smaller picture sizes have been developed due to progress in CCD manufacturing technology. In this connection, there is a need for a realization of a photographing lens for a CCD camera, having a high resolution and a short focal length.

There is a limitation to the miniaturization (reduction of thickness) of an optical element (filter, etc.) such as a low-pass filter or an infrared radiation cutting filter, which is provided in a space defined between the photographing lens and the CCD element because of the optical properties thereof.

A photographing lens of a conventional camera is conventionally a triplet type lens, a Tessar type lens, or a Gauss type lens. In these types of lenses, the back focal distance is relatively small with respect to the focal length. Consequently, an attempt to miniaturize the CCD element or reduce the focal length of the photographing lens in accordance therewith makes it difficult to provide an accommodation space for the optical elements including the filters in the camera.

SUMMARY OF THE INVENTION

It is an object of the present invention to provide a photographing lens whose F-number is approximately 2.8 and which exhibits an appropriate optical property for the half angle of view of approximately 25° and which has a back focal distance longer than the focal length.

According to the present invention, there is provided a photographing lens comprising a first lens group, a diaphragm, and a positive second lens group, in this order from the object side. The photographing lens satisfies the relationships defined by:

$$|f/f_1|<0.2 \quad (1)$$

$$0.7<h_{I-1}/h_{I-L}<1.0 \quad (2)$$

wherein f represents the focal length of the entire optical system, $f_I$ represents the focal length of the first lens group, $h_{I-1}$ represents the height of the incident point of paraxial on axis rays on the first surface of the first lens group, and $h_{I-L}$ represents the height of the incident point of the paraxial on axis rays on the last surface of the first lens group.

According to the following relationships, the height of the incident point refers to the height from the optical axis.

The first lens group can, for example, comprise a negative lens element whose image-side surface is a concave surface and a positive lens element whose image-side surface is a convex surface, arranged in this order from the object side. The first lens group preferably satisfies the following relationships:

$$0.3<d/f<1.0 \quad (3)$$

$$0.5<r_{I-2}/f<1.0 \quad (4)$$

wherein d presents the distance from the first surface of the first lens group to the last surface of the first lens group, and $r_{I-2}$ presents the radius of curvature of the surface of the negative lens element of the first lens group located on the image side.

According to the present invention, the power of the first lens group could be either positive or negative. Nevertheless, it is preferred that the first lens group has a positive power in view of distortion.

The present disclosure relates to subject matter contained in Japanese Patent Application Nos. 7-293010 (filed on Nov. 10, 1995) and 8-224084 (filed on Aug. 26, 1996) which are expressly incorporated herein by reference in their entireties.

BRIEF DESCRIPTION OF THE DRAWINGS

The invention will be described below in detail with reference to the attached drawings, in which;

FIG. 7 is a schematic view of a lens arrangement of a photographing lens according to a fourth embodiment of the present invention;

FIGS. 8A, 8B, 8C, 8D and 8E are aberration diagrams of a lens system shown in FIG. 7;

DESCRIPTION OF THE PREFERRED EMBODIMENTS

Figure 1:
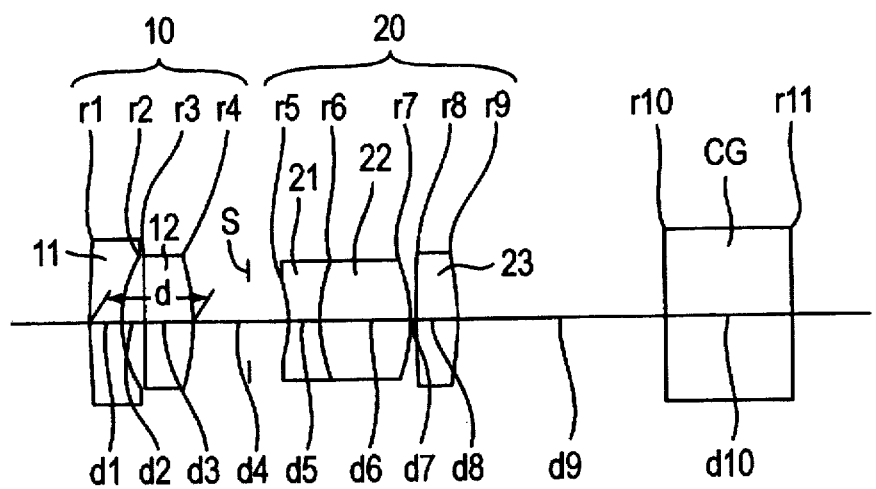
FIG. 1 is a schematic view of a lens arrangement of a photographing lens according to a first embodiment of the present invention.
Figures 2A, 2B, 2C, 2D, 2E:
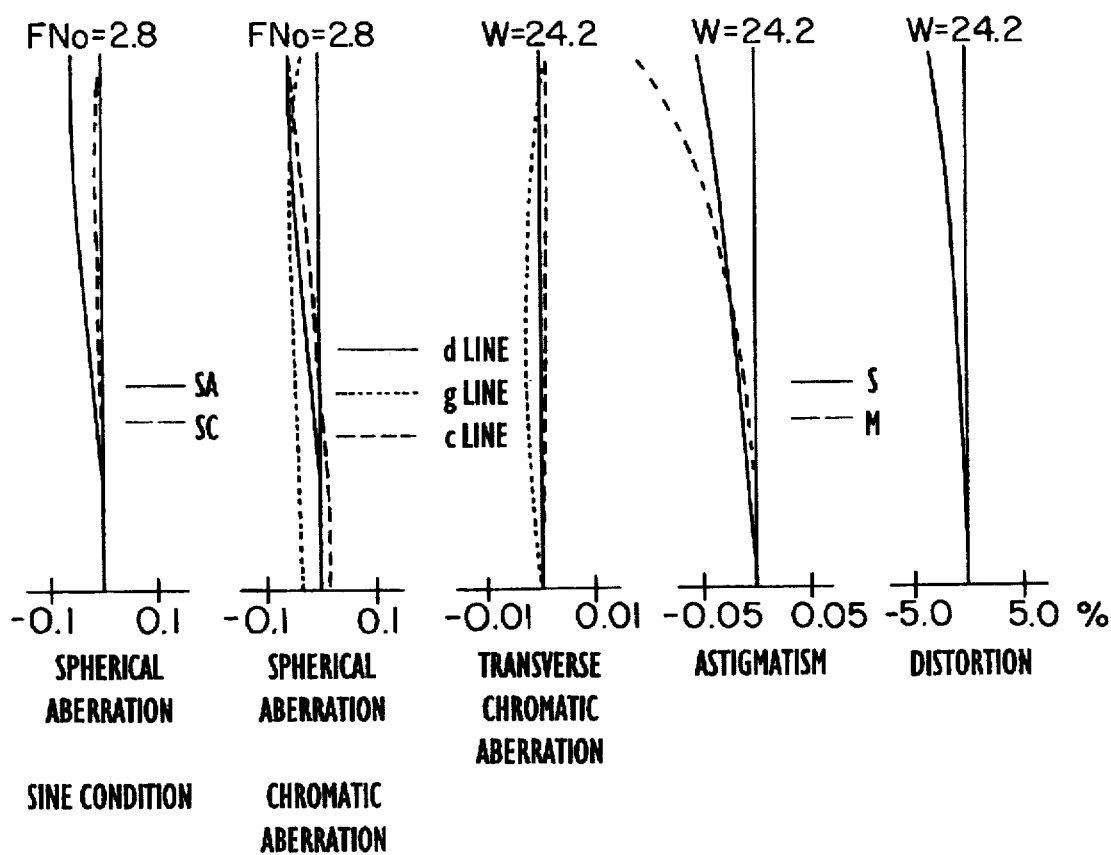
FIGS. 2A, 2B, 2C, 2D and 2E are aberration diagrams of a lens system shown in FIG. 1.

The inventor of the present invention has found that if the focal length of the second lens group is longer than the focal length of the entire optical system, the back focal distance of the second lens group can be longer than the focal length of the entire optical system, and if the first lens group is formed as a substantially afocal lens system in which the angular magnification is smaller than 1, the focal length of the second lens group can be reduced. Consequently, a desired focal length can be obtained while keeping a back focal distance of the entire optical system relatively long.

Relationship (1) specifies the power ratio between the first lens group and the entire lens system. If the power of the first lens group relative to the power of the entire optical system is set relatively small and the lens system is substantially an afocal lens system, as specified in relationship (1), not only can the occurrence of the aberrations be restricted, but also the focal length of the second lens group can be effectively reduced so as to obtain a desired focal length of the entire optical system. If the ratio defined in relationship (1) exceeds the upper limit, the power of the first lens group is too strong relative to the power of the whole optical system to obtain a long back focal distance. Moreover, it is impossible to restrict the aberrations, thus resulting in a deteriorated optical property.

Relationship (2) specifies the angular magnification of the second lens group. As mentioned above, the first lens group constitutes an approximate afocal lens system, as specified in relationship (1). Relationship (2) specifies the requirement to obtain an optimum optical property without reducing the back focal distance by appropriately reducing the angular magnification. If the ratio defined in relationship (2) is smaller than the lower limit, the angular magnification of the first lens group is so small that a large amount of negative distortion and comatic aberration, which cannot be corrected, occurs. If the ratio is above the upper limit, a long back focal distance cannot be obtained since the focal length of the second lens group must be shorter than the focal length of the whole lens system.

Relationship (3) specifies the requirement to obtain an optimum optical property by appropriately setting the whole length of the first lens group. If the ratio defined in relationship (3) is smaller than the lower limit, the position of the first negative lens element of the first lens group is too close to the second positive lens element thereof. In order to set the angular magnification to be small enough to meet the requirement of relationship (2), the power of the first negative lens element and the second positive lens element must be increased, thus resulting in an occurrence of an excess amount of high-order spherical aberration or comatic aberration. If the ratio exceeds the upper limit in relationship (3), the angular magnification of the first lens group is so small that an excess amount of negative distortion or comatic aberration occurs.

Relationship (4) specifies the requirement to provide an optimum optical performance by appropriately selecting the radius of curvature of the surface (second surface) of the first negative lens element of the first lens group, the surface (second surface) being located on the image side.

If the ratio defined in relationship (4) is below the lower limit, the radius of curvature of the second surface of the first negative lens element is so small that an over correction of the spherical aberration or comatic aberration takes place. If the ratio is above the upper limit in relationship (4), the radius of curvature of the surface of the first negative lens element on the image side is too large, and hence it becomes difficult to correct the spherical aberration or comatic aberration.

Six embodiments (numerical examples) of the present invention will be discussed below. In the six embodiments, the photographing lens is comprised of a first lens group 10, a diaphragm S, and a positive second lens group 20, in this order from the object side. The first lens group 10 is comprised of a negative lens element 11 having a concave surface located on the image side and a positive lens element 12 having a convex surface located on the image side, in this order from the object side. The second lens group 20 is comprised of a cemented lens assembly of a biconcave negative lens element 21 and a biconvex positive lens element 22 cemented thereto, and a biconvex lens element 23, in this order from the object side. There is a glass cover CG of the CCD located behind the second lens group 20. The surface (r11) of the glass cover CG located on the image side defines an image pickup surface of the CCD.

<Embodiment 1>

FIG. 1 shows a first embodiment of an optical system of a photographing lens according to the present invention. FIGS. 2A through 2E are diagrams of various aberrations of the optical system shown in FIG. 1. Numerical data of the lens system in the first embodiment is shown in Table 1 below.

In the aberration diagrams, "SA" designates the spherical aberration, "SC" the sine condition, "d-line", "g-line", and "C-line" the chromatic aberrations represented by the spherical aberrations and transverse chromatic aberrations, at the respective wavelengths, "S" the Sagittal rays, and "M" the Meridional rays, respectively.

In the following tables and drawings, "$F_{NO}$" designates the F-number representative of an aperture size, "f" the focal length, "W" the half angle of view, "$f_s$" the back focal distance, "R" the radius of curvature, "D" the thickness of a lens or the distance between lenses, "$N_d$" the refractive index of the d-line, and "$v_d$" the Abbe number of the d-line, respectively. Note that the back focal distance $f_B$ is a reduced distance from the last surface (r9) of the second lens group to the surface (r11) of the glass cover CG that is located on the image side ($f_B = D_g + (D_{10}/N_{10})$).

TABLE 1

$F_{NO} = 1:2.8$
$f = 5.22$
$W = 24.2$
$f_B = 7.76$

| surface No. | R | D | $N_d$ | $v_d$ |
|---|---|---|---|---|
| 1 | 28.233 | 0.80 | 1.51633 | 64.1 |
| 2 | 3.300 | 0.54 | — | — |
| 3 | 24.750 | 1.30 | 1.80518 | 25.4 |
| 4 | −7.700 | 1.43 | — | — |
| diaphragm | ∞ | 1.02 | — | — |
| 5 | −4.080 | 0.80 | 1.80518 | 25.4 |
| 6 | 3.982 | 2.40 | 1.67003 | 47.2 |
| 7 | −4.000 | 0.10 | — | — |
| 8 | 25.010 | 1.10 | 1.81600 | 46.6 |
| 9 | −9.680 | 5.54 | — | — |
| 10 | ∞ | 3.32 | 1.49782 | 66.8 |
| 11 | ∞ | — | — | — |

<Embodiment 2>

Figure 3:
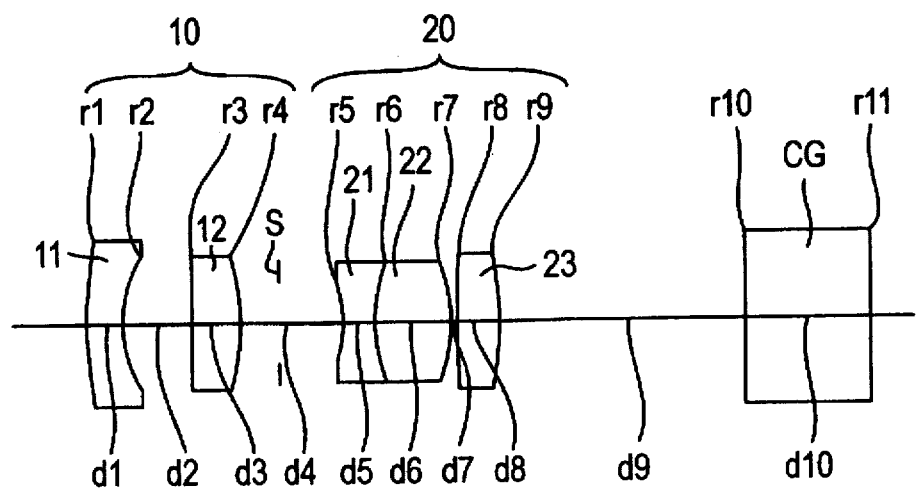
FIG. 3 is a schematic view of a lens arrangement of a photographing lens according to a second embodiment of the present invention.
Figures 4A, 4B, 4C, 4D, 4E:
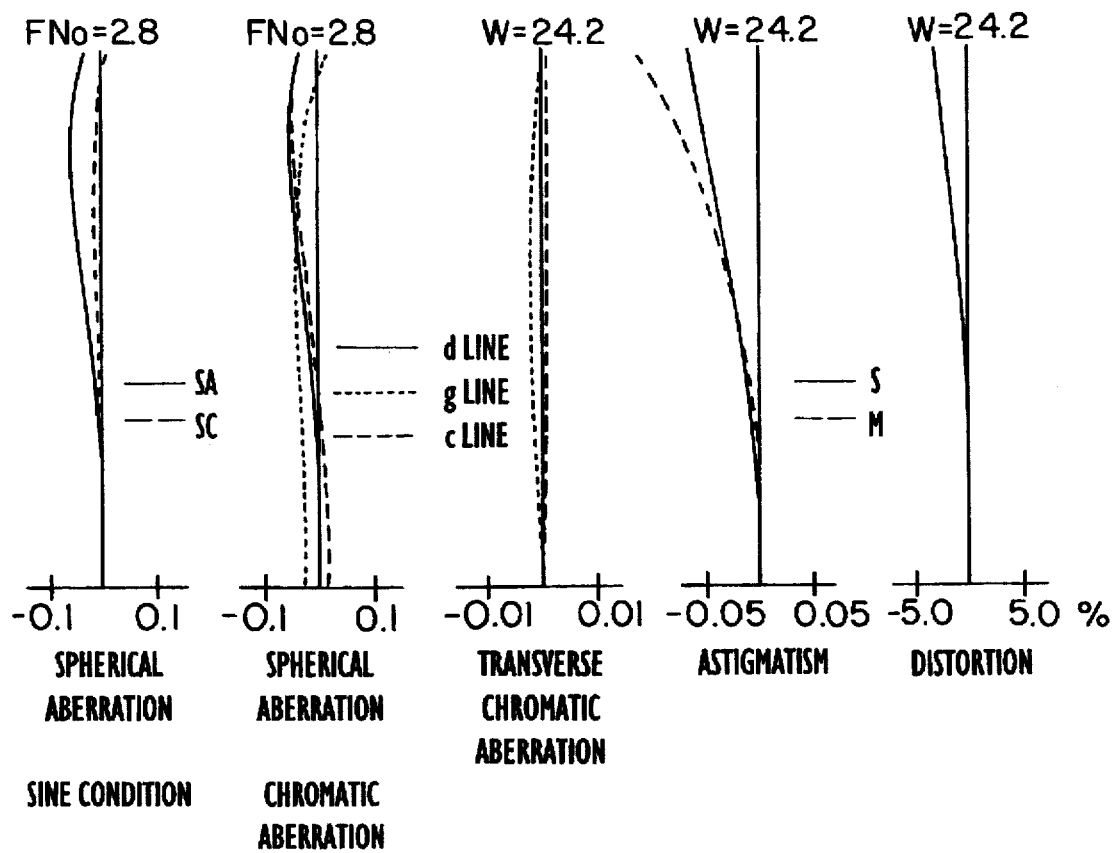
FIGS. 4A, 4B, 4C, 4D and 4E are aberration diagrams of a lens system shown in FIG. 3.

FIG. 3 shows a second embodiment of a lens arrangement of a photographing lens according to the present invention. FIGS. 4A through 4E are diagrams of various aberrations in the optical system shown in FIG. 3. Numerical data in the second embodiment is shown in Table 2 below.

TABLE 2

$F_{NO} = 1:2.8$
$f = 5.22$
$W = 24.2$
$f_B = 8.55$

| surface No. | R | D | $N_d$ | $v_d$ |
|---|---|---|---|---|
| 1 | 12.300 | 0.80 | 1.65844 | 50.9 |
| 2 | 3.120 | 1.85 | — | — |
| 3 | 47.807 | 1.30 | 1.80518 | 25.4 |
| 4 | −6.818 | 1.00 | — | — |
| diaphragm | ∞ | 1.59 | — | — |

TABLE 2-continued

| | | | | |
|---|---|---|---|---|
| 5 | -4.357 | 0.80 | 1.80518 | 25.4 |
| 6 | 4.483 | 2.00 | 1.63930 | 44.9 |
| 7 | -3.894 | 0.10 | — | — |
| 8 | 23.354 | 1.10 | 1.69680 | 55.5 |
| 9 | -9.260 | 6.33 | — | — |
| 10 | ∞ | 3.32 | 1.49782 | 66.8 |
| 11 | ∞ | — | — | — |

<Embodiment 3>

Figure 5:
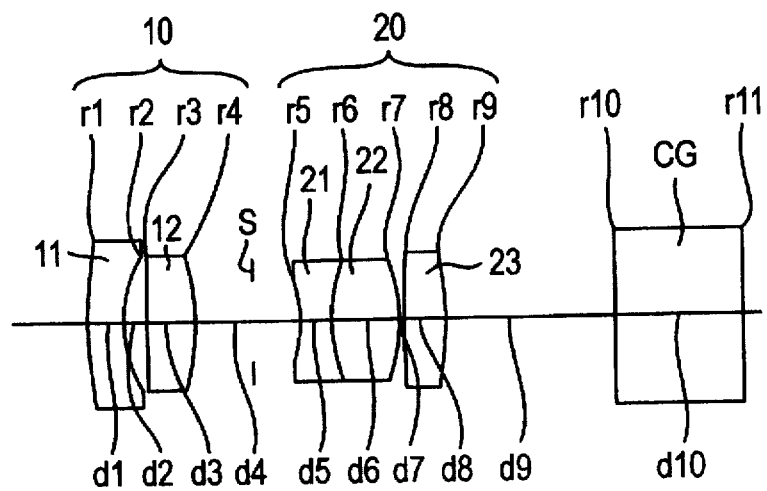
FIG. 5 is a schematic view of a lens arrangement of a photographing lens according to a third embodiment of the present invention.
Figures 6A, 6B, 6C, 6D, 6E:
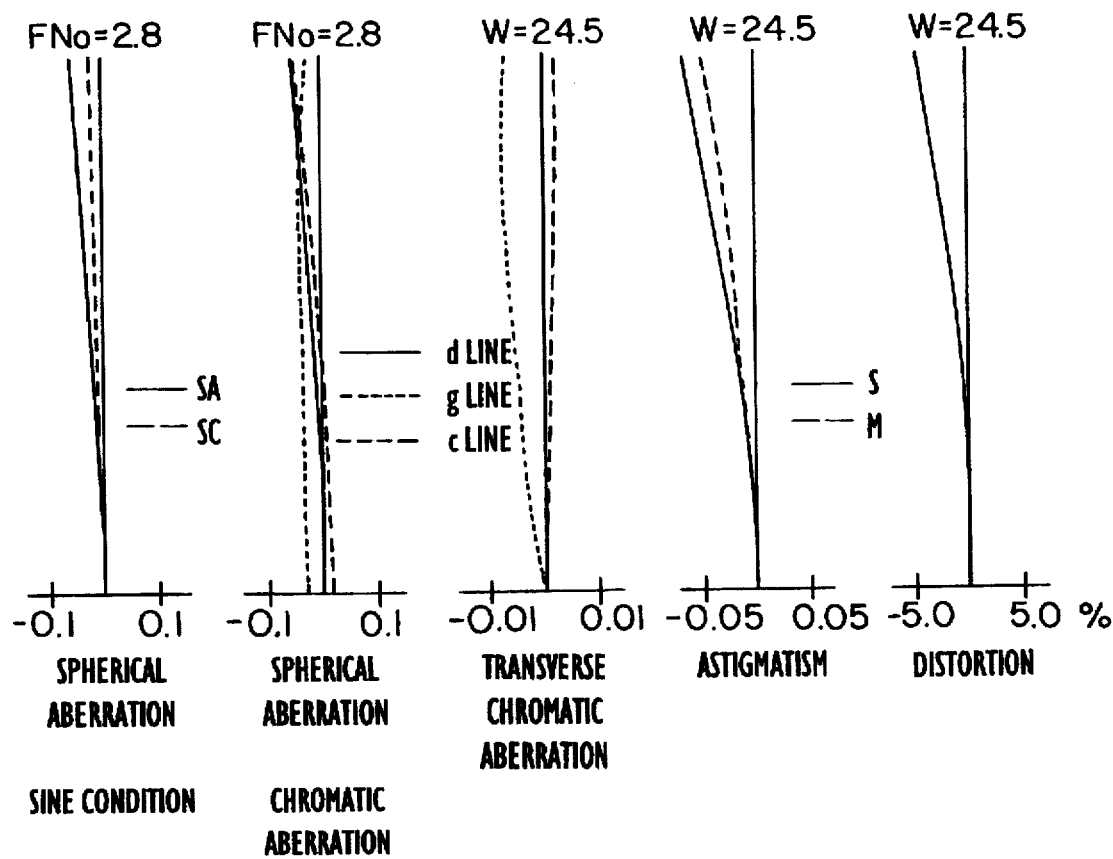
FIGS. 6A, 6B, 6C, 6D and 6E are aberration diagrams of a lens system shown in FIG. 5.

FIG. 5 shows a third embodiment of an optical system of a photographing lens according to the present invention. FIGS. 6A through 6E are diagrams of various aberrations in the optical system shown in FIG. 5. Numerical data in the third embodiment is shown in Table 3 below.

TABLE 3

$F_{NO} = 1:2.8$
$f = 5.21$
$W = 24.5$
$f_B = 6.73$

| surface No. | R | D | $N_d$ | $v_d$ |
|---|---|---|---|---|
| 1 | 7.040 | 0.80 | 1.48749 | 70.2 |
| 2 | 3.177 | 0.64 | — | — |
| 3 | 30.760 | 1.30 | 1.80518 | 25.4 |
| 4 | -14.420 | 1.48 | — | — |
| diaphragm | ∞ | 1.17 | — | — |
| 5 | -3.519 | 0.80 | 1.72825 | 28.5 |
| 6 | 2.822 | 1.80 | 1.68578 | 44.0 |
| 7 | -3.752 | 0.10 | — | — |
| 8 | 11.410 | 1.10 | 1.80400 | 46.6 |
| 9 | -14.900 | 4.51 | — | — |
| 10 | ∞ | 3.32 | 1.49782 | 66.8 |
| 11 | ∞ | — | — | — |

<Embodiment 4>

FIG. 7 shows a fourth embodiment of an optical system of a photographing lens according to the present invention. FIGS. 8A through 8E are diagrams of various aberrations in the optical system shown in FIG. 7. Numerical data in the fourth embodiment is shown in Table 4 below.

TABLE 4

$F_{NO} = 1:2.8$
$f = 5.26$
$W = 24.1$
$f_B = 7.19$

| surface No. | R | D | $N_d$ | $v_d$ |
|---|---|---|---|---|
| 1 | 18.246 | 0.60 | 1.56384 | 60.7 |
| 2 | 4.000 | 0.40 | — | — |
| 3 | 14.204 | 0.90 | 1.78472 | 25.7 |
| 4 | -9.482 | 1.00 | — | — |
| diaphragm | ∞ | 1.08 | — | — |
| 5 | -3.025 | 0.80 | 1.71736 | 29.5 |
| 6 | 3.000 | 2.40 | 1.62280 | 57.1 |
| 7 | -3.643 | 0.10 | — | — |
| 8 | 16.477 | 1.10 | 1.77250 | 49.6 |
| 9 | -9.376 | 4.97 | — | — |
| 10 | ∞ | 3.32 | 1.49782 | 66.8 |
| 11 | ∞ | — | — | — |

<Embodiment 5>

Figure 9:
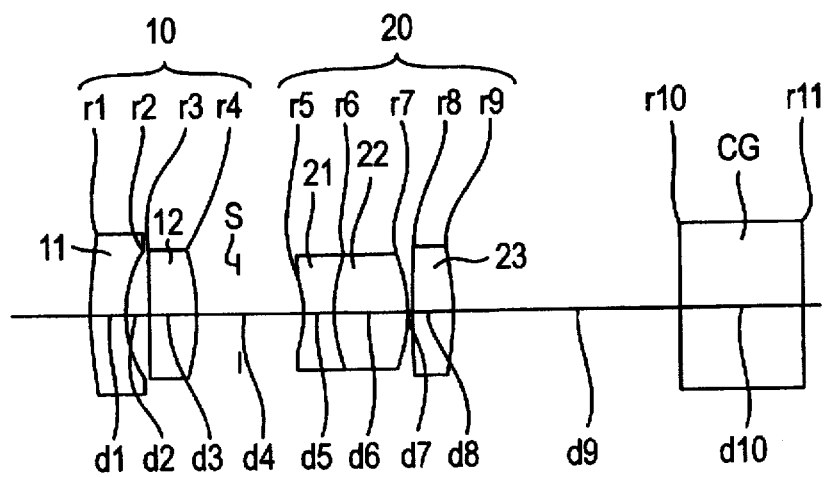
FIG. 9 is a schematic view of a lens arrangement of a photographing lens according to a fifth embodiment of the present invention.
Figures 10A, 10B, 10C, 10D, 10E:
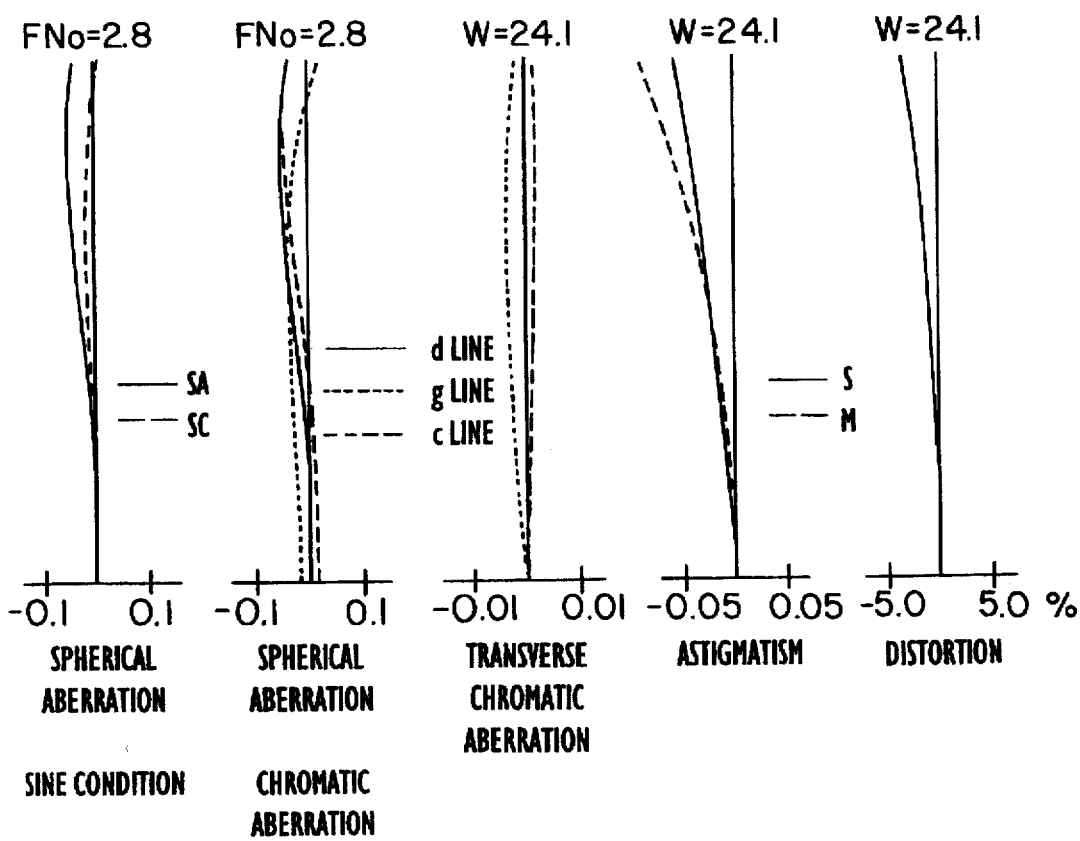
FIGS. 10A, 10B, 10C, 10D and 10E are aberration diagrams of a lens system shown in FIG. 9.

FIG. 9 shows a fifth embodiment of an optical system of a photographing lens according to the present invention. FIGS. 10A through 10E are diagrams of various aberrations in the optical system shown in FIG. 9. Numerical data in the fifth embodiment is shown in Table 5 below.

TABLE 5

$F_{NO} = 1:2.8$
$f = 5.25$
$W = 24.1$
$f_B = 8.22$

| surface No. | R | D | $N_d$ | $v_d$ |
|---|---|---|---|---|
| 1 | 10.803 | 0.80 | 1.55963 | 61.2 |
| 2 | 2.900 | 0.80 | — | — |
| 3 | -250.203 | 1.30 | 1.80518 | 25.4 |
| 4 | -7.107 | 1.00 | — | — |
| diaphragm | ∞ | 1.64 | — | — |
| 5 | -4.206 | 0.80 | 1.74000 | 28.3 |
| 6 | 4.050 | 2.00 | 1.61484 | 51.2 |
| 7 | -3.707 | 0.10 | — | — |
| 8 | 18.742 | 1.10 | 1.69680 | 55.5 |
| 9 | -9.157 | 6.00 | — | — |
| 10 | ∞ | 3.32 | 1.49782 | 66.8 |
| 11 | ∞ | — | — | — |

<Embodiment 6>

Figure 11:
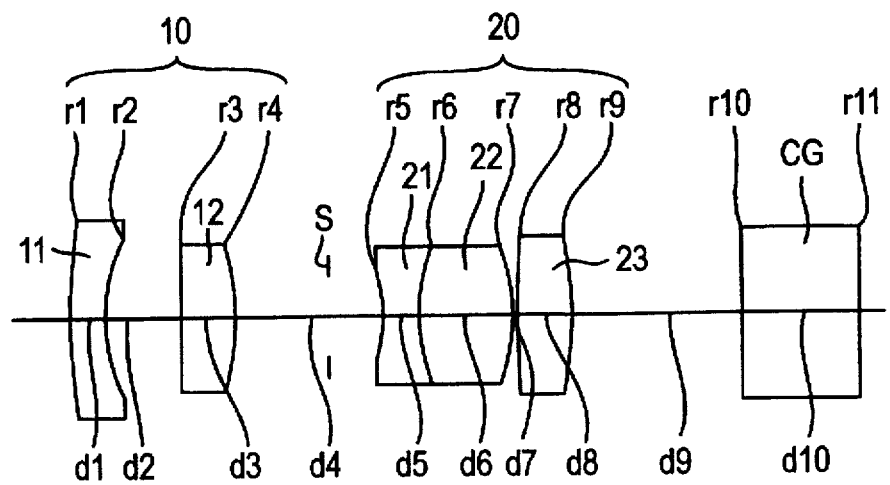
FIG. 11 is a schematic view of a lens arrangement of a photographing lens according to a sixth embodiment of the present invention; and, FIGS. 12A, 12B, 12C, 12D and 12E are aberration diagrams of a lens system shown in FIG. 11.
Figures 12A, 12B, 12C, 12D, 12E:
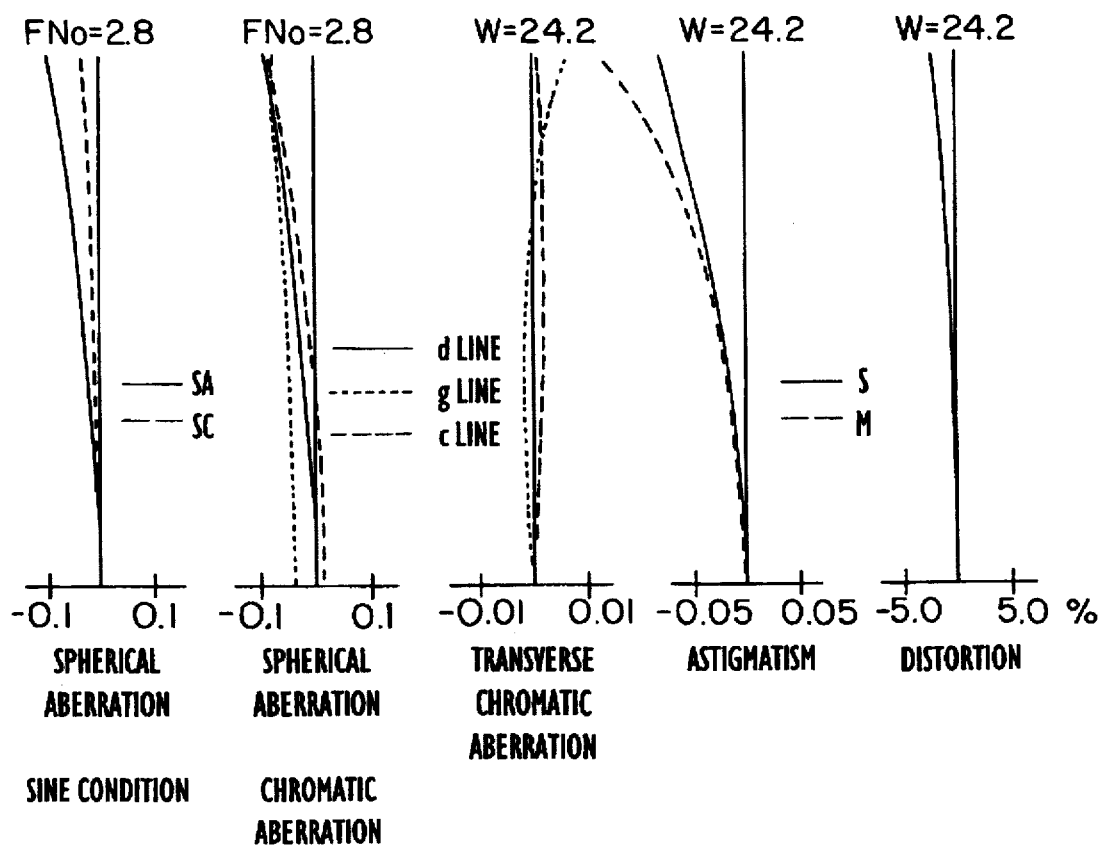

FIG. 11 shows a sixth embodiment of an optical system of a photographing lens according to the present invention. FIGS. 12A through 12E are diagrams of various aberrations in the optical system shown in FIG. 11. Numerical data in the sixth embodiment is shown in Table 6 below.

TABLE 6

$F_{NO} = 1:2.8$
$f = 5.26$
$W = 24.6$
$f_B = 7.77$

| surface No. | R | D | $N_d$ | $v_d$ |
|---|---|---|---|---|
| 1 | 13.650 | 0.80 | 1.69680 | 55.5 |
| 2 | 4.284 | 2.12 | — | — |
| 3 | 34.227 | 1.40 | 1.80518 | 25.4 |
| 4 | -9.600 | 2.45 | — | — |
| diaphragm | ∞ | 1.44 | — | — |
| 5 | -4.626 | 0.90 | 1.84666 | 23.8 |
| 6 | 4.626 | 2.45 | 1.72000 | 42.0 |
| 7 | -4.626 | 0.10 | — | — |
| 8 | 15.243 | 1.47 | 1.83481 | 42.7 |
| 9 | -15.243 | 4.36 | — | — |
| 10 | ∞ | 3.12 | 1.49782 | 66.8 |
| 11 | ∞ | — | — | — |

Table 7 below shows numerical values of relationships (1) through (4) for the six embodiments mentioned above.

TABLE 7

| | Embodiment 1 | Embodiment 2 | Embodiment 3 |
|---|---|---|---|
| relationship (1) | 0.088 | 0.149 | 0.035 |
| relationship (2) | 0.879 | 0.741 | 0.952 |
| relationship (3) | 0.506 | 0.757 | 0.526 |
| relationship (4) | 0.633 | 0.598 | 0.609 |

| | Embodiment 4 | Embodiment 5 | Embodiment 6 |
|---|---|---|---|
| relationship (1) | 0.190 | 0.029 | 0.141 |
| relationship (2) | 0.946 | 0.846 | 0.790 |
| relationship (3) | 0.361 | 0.553 | 0.821 |
| relationship (4) | 0.760 | 0.553 | 0.814 |

Table 8 below shows the ratio $f_B/f$ of the back focal distance and the focal length of the whole lens system for the six embodiments mentioned above.

TABLE 8

|  | $f_B/f$ |
|---|---|
| embodiment 1 | 1.487 |
| embodiment 2 | 1.638 |
| embodiment 3 | 1.292 |
| embodiment 4 | 1.367 |
| embodiment 5 | 1.566 |
| embodiment 6 | 1.477 |

As can be seen from Table 7, the first through sixth embodiments satisfy the requirements defined by relationships (1) through (4). Moreover, it can be also found that the back focal distance is longer than the focal length in each embodiment as shown in Table 8.

As may be understood from the above discussion, according to the present invention, a photographing lens whose F-number is approximately 2.8 and which exhibits an optimum optical property for the half angle of view of around 25° and has a long back focal distance can be provided.

What is claimed is:

1. A photographing lens comprising a first lens group, a diaphragm, and a positive second lens group, in this order from the object side, wherein said photographing lens satisfies the relationships defined by the following:

$$|f/f_1|<0.2$$

$$0.7<h_{I-1}/h_{I-L}<1.0$$

wherein f represents the focal length of the entire optical system of the photographing lens, $f_1$ represents the focal length of the first lens group, $h_{I-1}$ represents the height of the incident point of paraxial on axis rays from the optical axis on the first surface of the first lens group, and $h_{I-L}$ represents the height of the incident point of said paraxial on axis rays from the optical axis on the last surface of the first lens group.

2. A photographing lens according to claim 1, wherein the first lens group comprises a negative lens element, an image-side surface of said negative lens element being a concave surface, and a positive lens element, an image-side surface of said positive lens element being a convex surface, arranged in this order from the object side, and wherein the first lens group satisfies:

$$0.3<d/f<1.0$$

$$0.5<r_{1-2}/f<1.0$$

wherein d represents the distance from the first surface of the first lens group to the last surface of the first lens group, and $r_{1-2}$ represents the radius of curvature of the image side surface of the negative lens element of the first lens group.

3. A photographing lens according to claim 1, wherein the first lens group has positive power and the second lens group is comprised of a cemented lens assembly of biconcave and biconvex lens elements and a biconvex lens in this order from the object side.

* * * * *